United States Patent
Kim et al.

(10) Patent No.: US 12,211,983 B2
(45) Date of Patent: Jan. 28, 2025

(54) BATTERY MODULE HAVING STRUCTURE CAPABLE OF RAPID COOLING, AND ESS COMPRISING SAME

(71) Applicant: LG ENERGY SOLUTION, LTD., Seoul (KR)

(72) Inventors: Seung-Hyun Kim, Daejeon (KR); Ji-Won Jeong, Daejeon (KR); Kyung-Hyun Bae, Daejeon (KR); Jin-Kyu Shin, Daejeon (KR); Jin-Kyu Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 17/766,925

(22) PCT Filed: Mar. 4, 2021

(86) PCT No.: PCT/KR2021/002710
§ 371 (c)(1),
(2) Date: Apr. 6, 2022

(87) PCT Pub. No.: WO2021/177760
PCT Pub. Date: Sep. 10, 2021

(65) Prior Publication Data
US 2024/0088469 A1  Mar. 14, 2024

(30) Foreign Application Priority Data
Mar. 5, 2020  (KR) ........................ 10-2020-0027899

(51) Int. Cl.
*H01M 10/613* (2014.01)
*H01M 10/6562* (2014.01)
(Continued)

(52) U.S. Cl.
CPC ..... *H01M 10/613* (2015.04); *H01M 10/6562* (2015.04); *H01M 10/6567* (2015.04);
(Continued)

(58) Field of Classification Search
None
See application file for complete search history.

(56) References Cited

U.S. PATENT DOCUMENTS

2008/0003495 A1* 1/2008 Shimizu ............ H01M 10/651
429/120
2012/0279586 A1* 11/2012 Kim ........................ E03F 7/04
137/527
(Continued)

FOREIGN PATENT DOCUMENTS

CN 109893802 A 6/2019
CN 217468625 U 9/2022
(Continued)

OTHER PUBLICATIONS

International Search Report (PCT/ISA/210) issued in PCT/KR2021/002710, dated Jun. 18, 2021.
(Continued)

*Primary Examiner* — Lisa S Park
(74) *Attorney, Agent, or Firm* — Birch, Stewart, Kolasch & Birch, LLP

(57) ABSTRACT

A battery module includes a sub module including a cell stack having a plurality of battery cells and a pair of bus bar frames respectively coupled to one side and the other side of the cell stack; a module housing configured to accommodate the sub module and configured to have an air inlet and an air outlet formed to circulate air; a sprinkler provided through the module housing at one side of the cell stack in a stacking direction; and an outlet closing device configured to move by a buoyancy generated by a cooling water introduced into
(Continued)

the module housing through the sprinkler so that the air outlet is closed.

13 Claims, 14 Drawing Sheets

(51) Int. Cl.
  *H01M 10/6567*  (2014.01)
  *H01M 50/143*  (2021.01)
  *H01M 50/375*  (2021.01)
  *H01M 50/507*  (2021.01)

(52) U.S. Cl.
  CPC ....... *H01M 50/143* (2021.01); *H01M 50/375* (2021.01); *H01M 50/507* (2021.01)

(56) References Cited

U.S. PATENT DOCUMENTS

| | | |
|---|---|---|
| 2013/0089763 A1 | 4/2013 | Lee |
| 2014/0335388 A1 | 11/2014 | Jin |
| 2015/0221914 A1 | 8/2015 | Page et al. |
| 2017/0365888 A1 | 12/2017 | Kwon et al. |
| 2023/0223621 A1 | 7/2023 | Ok et al. |

FOREIGN PATENT DOCUMENTS

| | | | |
|---|---|---|---|
| EP | 4 024 579 | A1 | 7/2022 |
| JP | 5-31207 | A | 2/1993 |
| JP | 7-9259 | U | 2/1995 |
| JP | 2010-185558 | A | 8/2010 |
| JP | 2010-186568 | * | 8/2010 |
| JP | 2013-131416 | A | 7/2013 |
| JP | 2013-246920 | A | 12/2013 |
| JP | 2014-216248 | A | 11/2014 |
| JP | 2015-220176 | A | 12/2015 |
| JP | 2018-133134 | A | 8/2018 |
| JP | 2019-029126 | * | 2/2019 |
| KR | 20-0406311 | Y1 | 1/2006 |
| KR | 200406311 | * | 1/2006 |
| KR | 10-2018-0056892 | A | 5/2013 |
| KR | 10-2014-0084594 | A | 7/2014 |
| KR | 10-2016-0132143 | A | 11/2016 |
| KR | 10-2018-0038291 | A | 4/2018 |
| KR | 10-2019-0035580 | A | 4/2019 |
| KR | 10-2064416 | B1 | 1/2020 |

OTHER PUBLICATIONS

European Search Report issued in Application No. 21764340.2, dated Sep. 29, 2022.

* cited by examiner

BATTERY MODULE HAVING STRUCTURE CAPABLE OF RAPID COOLING, AND ESS COMPRISING SAME

TECHNICAL FIELD

The present disclosure relates to a battery module having a structure allowing rapid cooling and an ESS including the battery module. More specifically, the present disclosure relates to a battery module having a structure capable of rapidly increasing a level of a cooling fluid (for example, a cooling water) for fire extinguishing and cooling when a sprinkler is operated since a venting gas is leaked inside the battery module, and an ESS including the battery module.

The present application claims priority to Korean Patent Application No. 10-2020-0027899 filed on Mar. 5, 2020 in the Republic of Korea, the disclosures of which are incorporated herein by reference.

BACKGROUND ART

Currently commercialized secondary batteries include nickel cadmium batteries, nickel hydride batteries, nickel zinc batteries, and lithium secondary batteries. Among them, lithium secondary batteries are in the spotlight since they have little memory effect compared to nickel-based secondary batteries to secure free charging and discharging and also have a very low discharge rate and high energy density.

The lithium secondary battery mainly uses a lithium-based oxide and a carbon material as a positive electrode active material and a negative electrode active material, respectively. The lithium secondary battery includes an electrode assembly in which a positive electrode plate and a negative electrode plate respectively coated with a positive electrode active material and a negative electrode active material are disposed with a separator being interposed therebetween, and an exterior, namely a battery pouch exterior, for sealing and storing the electrode assembly together with an electrolyte.

Recently, secondary batteries are widely used not only in small devices such as portable electronic devices, but also in medium-sized or large-sized devices such as vehicles and energy storage systems. When used in such a medium-sized or large-sized device, a large number of secondary batteries are electrically connected to increase capacity and output. In particular, pouch-type secondary batteries are widely used in such medium-sized devices since they may be stacked easily.

Meanwhile, as the need for a large-capacity structure is increasing recently along with utilization as an energy storage source, the demand for a battery module including a plurality of secondary batteries electrically connected in series and/or in parallel is increasing.

In addition, the battery module generally has an outer housing made of a metal material to protect or store a plurality of secondary batteries from an external shock. Meanwhile, the demand for high-capacity battery modules is increasing recently.

In the case of such a high-capacity battery module, if the temperature inside the battery module increases since venting occurs in at least some of the internal battery cells, great damage may be generated. That is, if a thermal runaway phenomenon occurs due to an increase in internal temperature, the temperature of the high-capacity battery module may increase rapidly, and accordingly a large-scale ignition and/or explosion may occur.

Accordingly, it is necessary to develop a rapid and complete fire extinguishing technology to take immediate measures when an abnormal temperature rise occurs due to venting occurring in a battery cell inside the battery module.

DISCLOSURE

Technical Problem

The present disclosure is designed to solve the problems of the related art, and therefore the present disclosure is directed to rapidly increasing a level of a cooling fluid (for example, a cooling water) for fire extinguishing and cooling to secure rapid fire extinguishing and cooling when a sprinkler is operated since a venting gas is leaked inside a battery module, and an ESS including the battery module.

However, the technical problem to be solved by the present disclosure is not limited to the above, and other objects not mentioned herein will be understood from the following description by those skilled in the art.

Technical Solution

In one aspect of the present disclosure, there is provided a battery module, comprising: a sub module including a cell stack having a plurality of battery cells and a pair of bus bar frames respectively coupled to a first side and a second side of the cell stack; a module housing configured to accommodate the sub module and configured to have an air inlet and an air outlet formed to circulate air; a sprinkler provided through the module housing at one side of the cell stack in a stacking direction; and an outlet closure configured to move by a buoyancy generated by a cooling water introduced into the module housing through the sprinkler so that the air outlet is closed.

The outlet closure may include a fixing bar fixed on an inner surface of the module housing; a sealing door hinged to the fixing bar; and a buoyancy member attached to the sealing door.

The fixing bar may have at least two guide grooves, the sealing door may include sliding balls in a number corresponding to the number of the guide grooves, and each sliding ball may be inserted into respective one of the at least two guide grooves and guided to move along an extension direction of the at least two guide grooves.

Each of the at least two guide grooves may be shaped to be inclined upward toward the air outlet.

The air outlet may have a plurality of holes formed through the module housing, and the sealing door may have a plurality of insert protrusions having a shape and size corresponding to the plurality of holes.

The battery module may comprise an expansion pad disposed at an inner side of the air inlet and configured to at least partially close the air inlet by expanding when contacting the cooling fluid introduced into the battery module.

The expansion pad may be attached onto an inner surface of the module housing.

The expansion pad may be at least partially inserted into an accommodation groove formed at an inner surface of the module housing.

The battery module may comprise mesh plates respectively disposed at opposite sides of the expansion pad to guide an expanding movement of the expansion pad.

The battery module may comprise a thermal expansion block disposed at an empty space inside the module housing to thermally expand as an internal temperature of the module housing rises.

The sprinkler may include a coupler positioned at an outer side of the module housing and configured to be connected to a supply tube that supplies a cooling fluid; a sprinkler head positioned at an inner side of the module housing and connected to the coupler; and an insulation cover including a fixing portion fixed to the module housing and a cover portion fixed to the fixing portion by a bonding layer and configured to be separated from the fixing portion when an internal temperature of the module exceeds a reference temperature as a bonding force of the bonding layer is decreased or lost.

The cover portion may be hinged to the fixing portion and is opened by rotating to a lower side of the sprinkler head.

Meanwhile, an energy storage system (ESS) according to an embodiment of the present disclosure comprises a plurality of battery modules according to the present disclosure.

Advantageous Effects

According to an embodiment of the present disclosure, when a sprinkler is operated since a venting gas is leaked inside a battery module, it is possible rapidly increasing a level of a cooling fluid (for example, a cooling water) for fire extinguishing and cooling, thereby allowing rapid cooling and fire extinguishing.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 8:
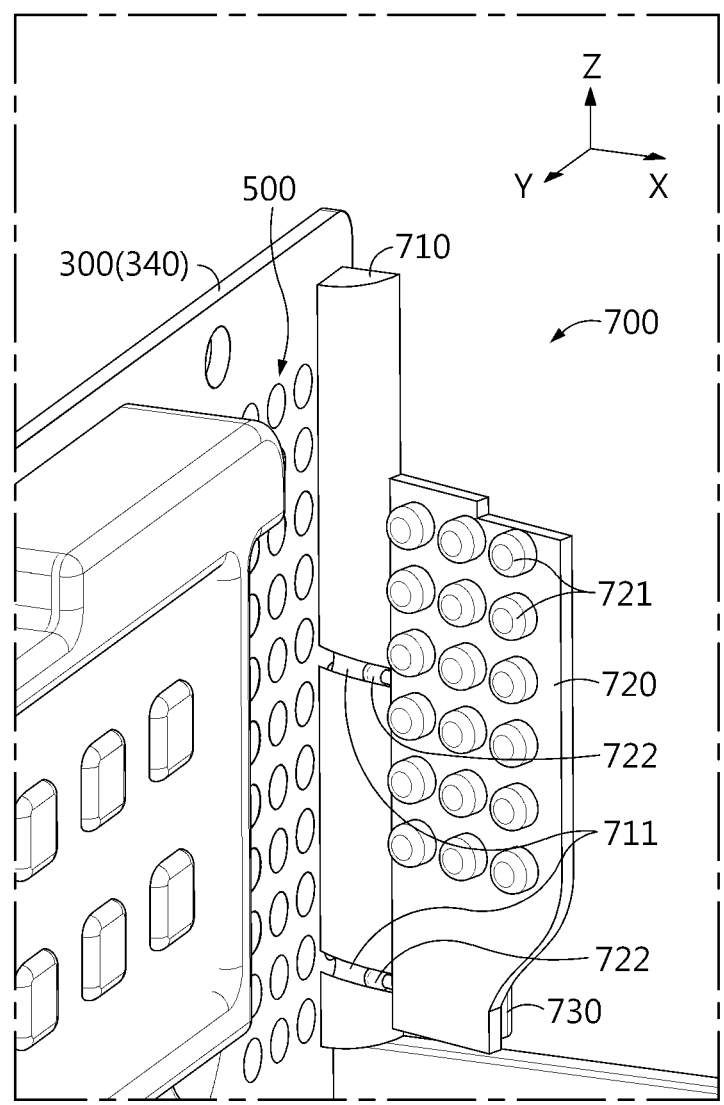
FIGS. 8 to 11 are diagrams showing an outlet closing device applied to the subject invention.
Figure 9:
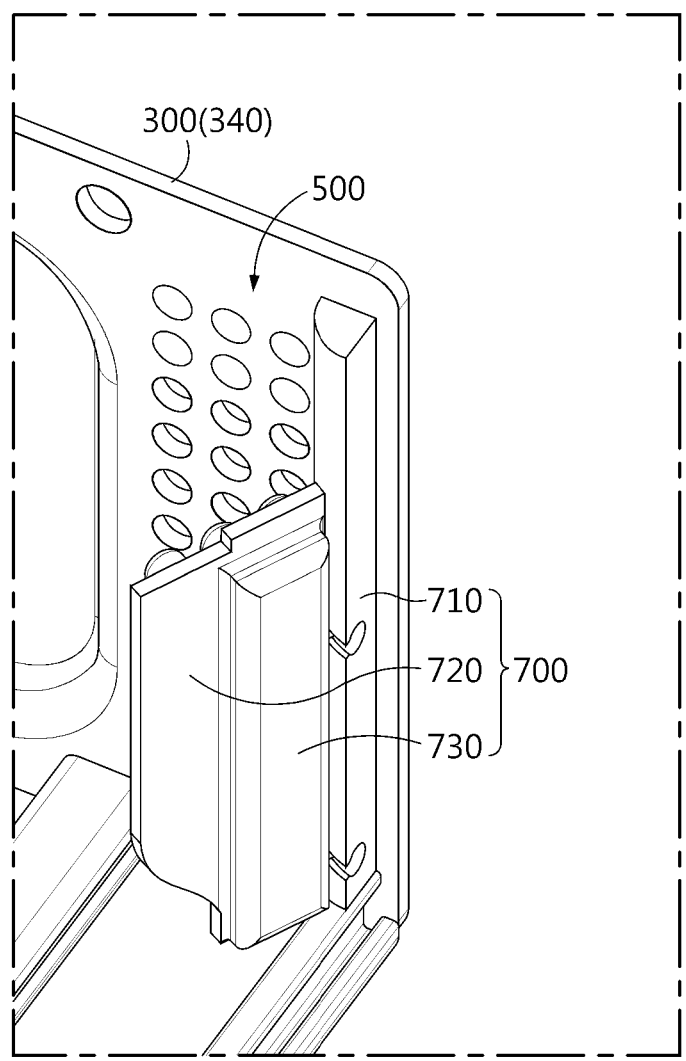
Figure 10:
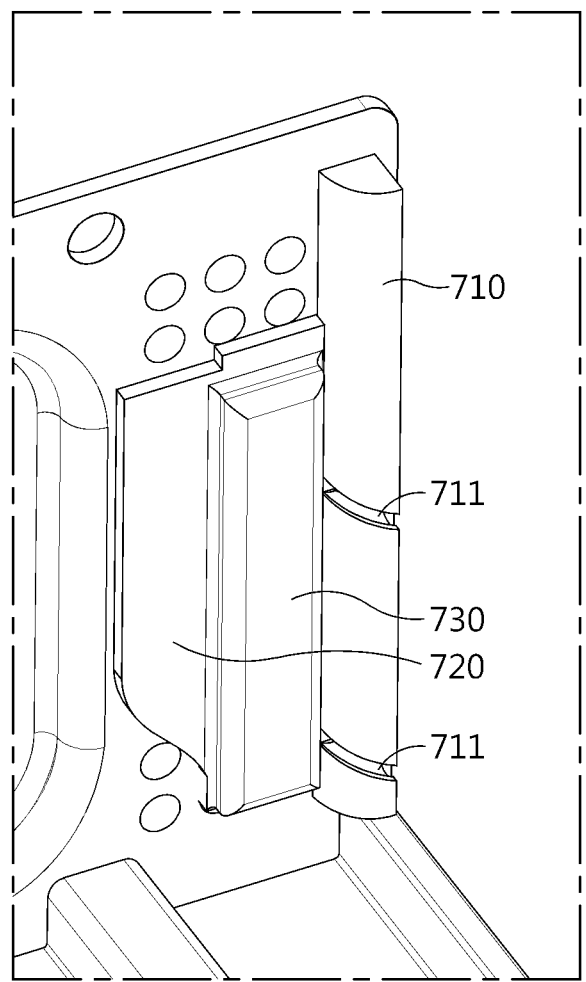
Figure 11:
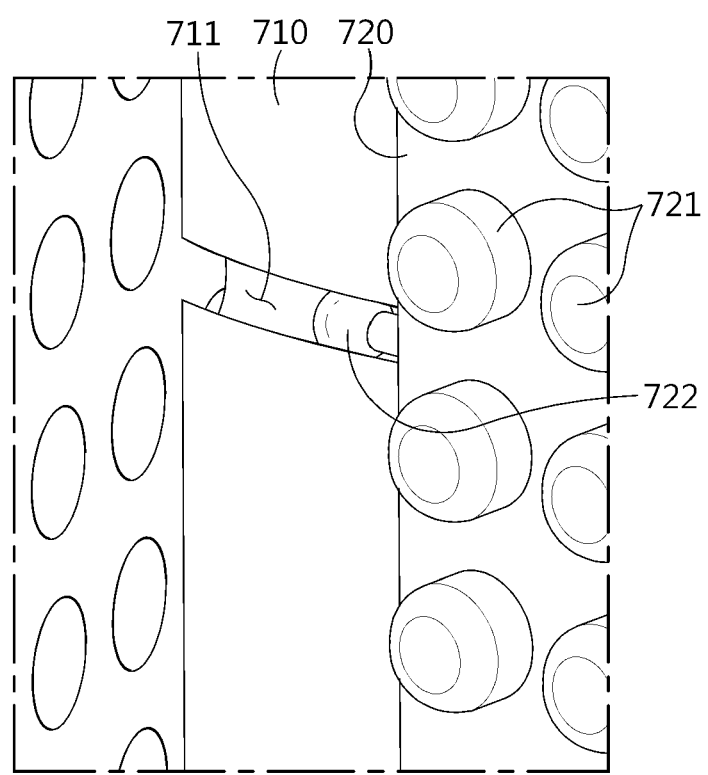
Figure 12:
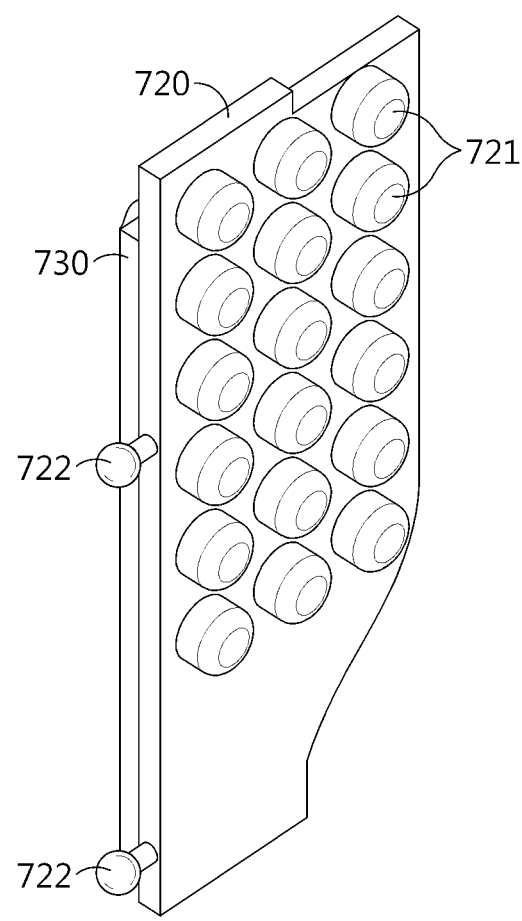
FIG. 12 is a diagram showing a sealing door and a buoyancy member applied to the subject invention.

First, referring to all drawings, a battery module 1 according to an embodiment of the present disclosure includes a plurality of battery cells 100, a bus bar frame 200, a module housing 300, an air inlet 400, an air outlet 500, a sprinkler 600 and an outlet closing device 700 (see FIG. 8). In addition, the battery module 1 may further include a thermal expansion block B and/or an expansion pad E.

Referring to FIGS. 3 to 6, the battery cell 100 is provided in plural, and the plurality of battery cells 100 are stacked to form one cell stack. The battery cell 100 may employ, for example, a pouch-type battery cell. The battery cell 100 includes a pair of electrode leads 110 respectively drawn out at both sides in a longitudinal direction (a direction parallel to the Y axis shown in the figure). Meanwhile, although not shown in the drawings, the cell stack may further include a buffer pad provided between the battery cells 100 adjacent to each other, if necessary. When the cell stack is accommodated in the module housing 300, the buffer pad allows the cell stack to be accommodated in a compressed state, thereby limiting movement caused by external shocks and suppressing a swelling phenomenon of the battery cells 100.

Referring to FIGS. 3 to 6, the bus bar frame 200 is provided in a pair, and the pair of bus bar frames 200 cover one side and the other side of the cell stack in a width direction (a direction parallel to the Y axis in the figure). The electrode lead 110 of the battery cell 100 is drawn through a slit formed at the bus bar frame 200, and is bent and fixed by welding or the like onto a bus bar provided to the bus bar frame 200. That is, the plurality of battery cells 100 may be connected in series, in parallel, or both in series and in parallel, by the bus bar provided to the bus bar frame 200.

The cell stack and the bus bar frame 200 may be coupled to each other to form a single sub module.

Figure 1:
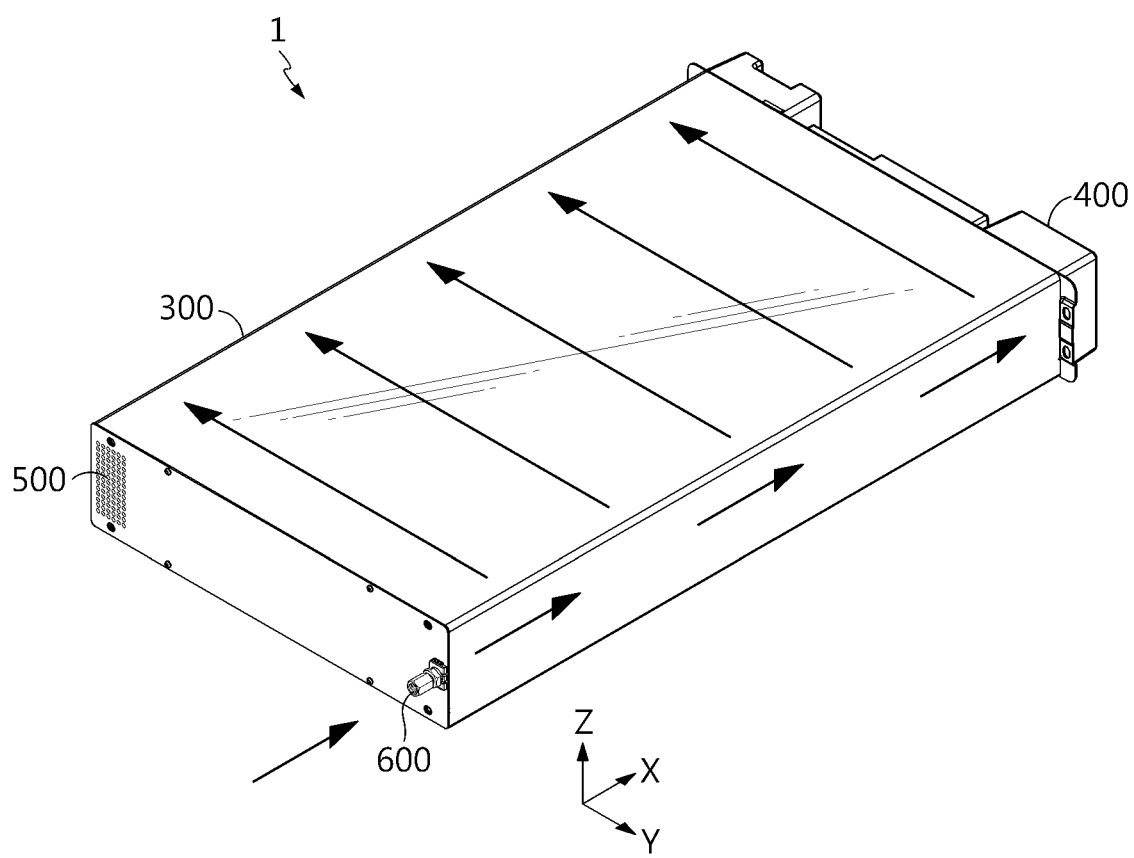
FIGS. 1 and 2 are perspective views showing a battery module according to an embodiment of the present disclosure.
Figure 2:
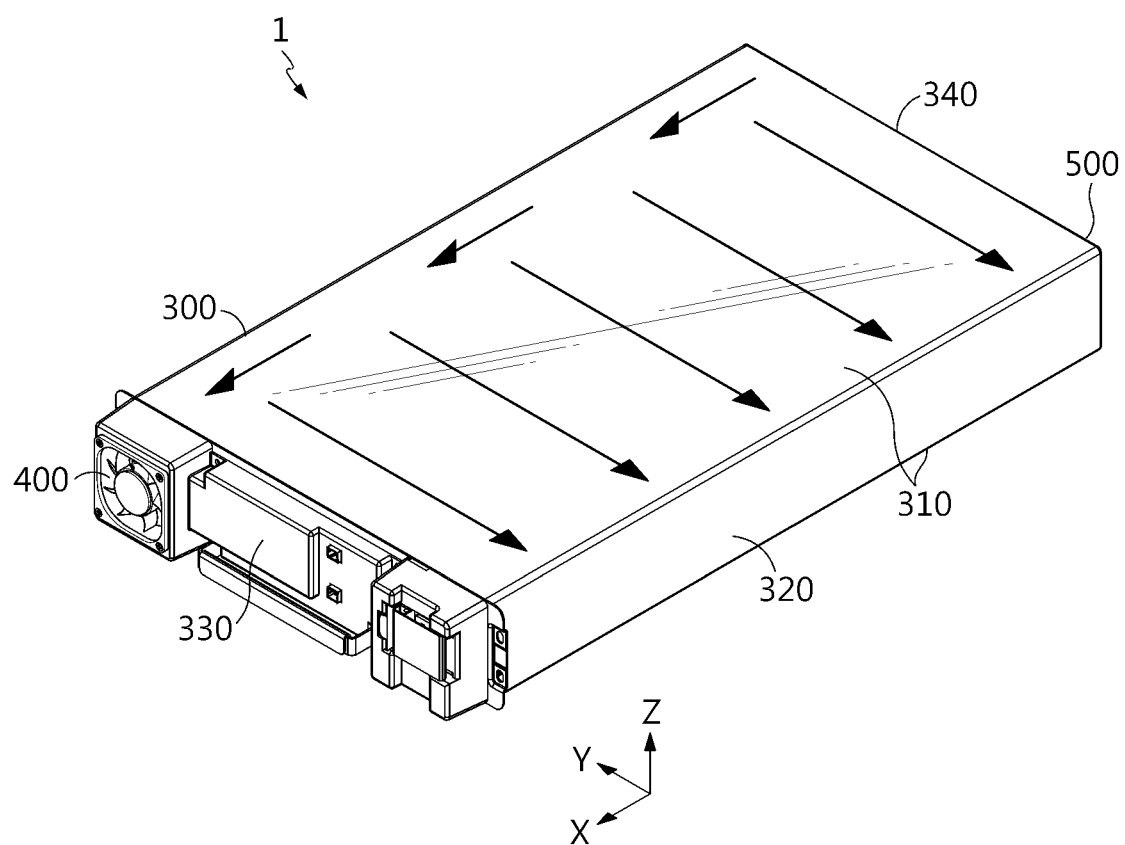
Figure 3:
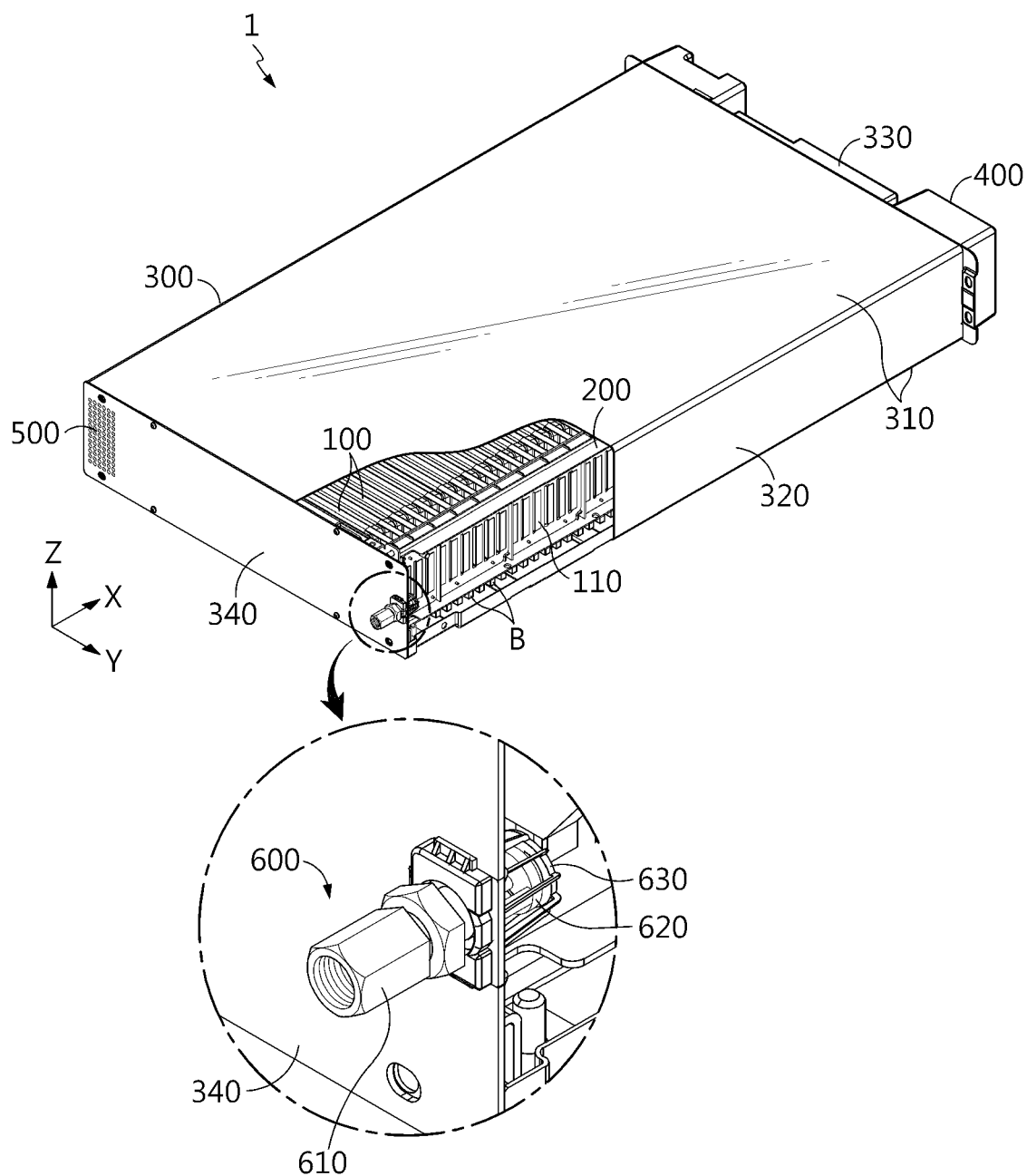
FIG. 3 is a diagram showing an inner structure of the battery module depicted in FIGS. 1 and 2.

Referring to FIGS. 1 to 3, the module housing 300 has a substantially rectangular parallelepiped shape, and accommodates an assembly of the cell stack and the bus bar frame 200, namely the sub module, therein. The module housing 300 includes a pair of base covers 310 respectively configured to cover a lower surface and an upper surface of the sub module (surfaces parallel to the X-Y plane), a pair of side covers 320 respectively configured to cover side surfaces of the sub module (surfaces parallel to the X-Z plane), a front cover 330 configured to cover a front surface of the sub module (a surface parallel to the Y-Z plane), and a rear cover 340 configured to cover a rear surface of the sub module (a surface parallel to the Y-Z plane).

Referring to FIGS. 1 to 3, the air inlet 400 is formed at one side of the cell stack in the stacking direction (a direction parallel to the X axis), namely at one side of the battery module 1 in the longitudinal direction and has a hole shape formed through the front cover 330. The air outlet 500 is formed at the other side of the cell stack in the stacking direction, namely at the other side of the battery module 1 in the longitudinal direction and has a plurality of holes formed through the rear cover 340. The air inlet 400 and the air outlet 500 are located at diagonally opposite sides along the longitudinal direction (a direction parallel to the X axis) of the battery module 1.

Referring to FIG. 3, an empty space is formed between the bus bar frame 200 and the side cover 320. That is, the empty space in which air for cooling the battery cell 100 flows is formed between one of six outer surfaces of the module housing 300 facing one side and the other side of the sub module in the width direction (a direction parallel to the Y axis) and the bus bar frame 200. The empty space is formed at each of both sides of the battery module 1 in the width direction (a direction parallel to the Y axis).

The air inlet 400 is formed at a location corresponding to the empty space formed at one side of the battery module 1 in the width direction (a direction parallel to the Y axis), and the air outlet 500 is formed at a location corresponding to the empty space formed at the other side of the battery module 1 in the width direction.

In the battery module 1, the air introduced therein through the air inlet 400 cools the battery cell 100 while moving from the empty space formed at one side of the battery module 1 in the width direction to the empty space formed at the other side of the battery module 1 in the width direction, and then goes out through the air outlet 500. That is, the battery module 1 corresponds to an air-cooled battery module.

Meanwhile, in the present disclosure, the air inlet 400 may also be used for cooling to serve as a passage through which a heated air risen is discharged, unlike its name. Also, the air outlet 500 may also be used as a passage through which an external air for cooling is introduced, unlike its name. That is, an impeller for forced ventilation may be installed at the air inlet 400, and the direction of air circulation may vary depending on a rotation direction of the impeller.

Figure 6:
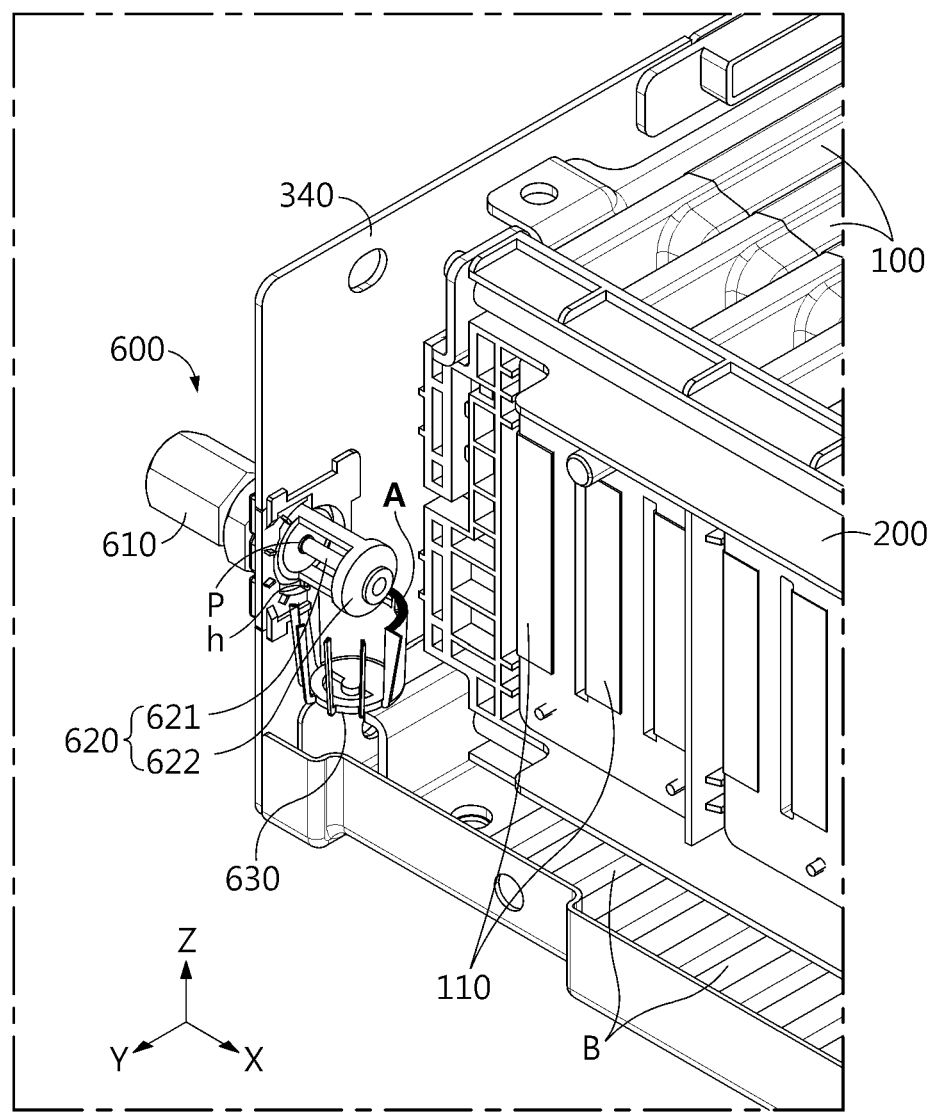
FIG. 6 is a diagram showing an inner structure of the battery module according to an embodiment of the present disclosure, in which an insulation cover applied in the present disclosure is opened.
Figure 7:
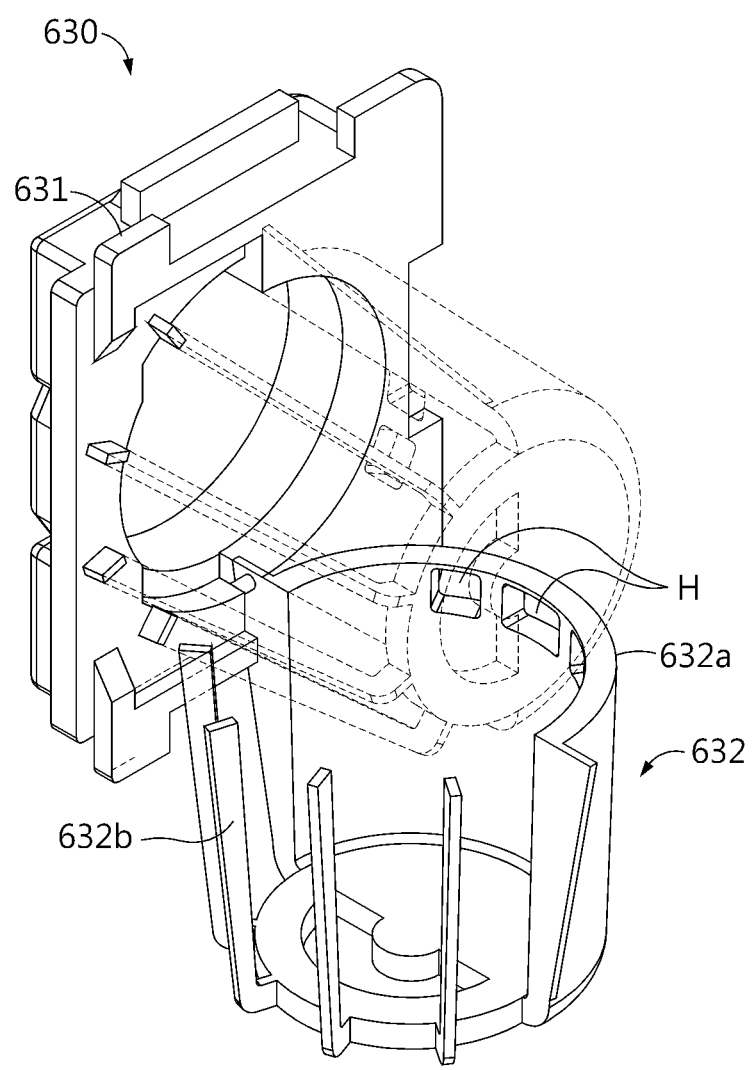
FIG. 7 is a perspective view showing the insulation cover applied in the present disclosure.

Referring to FIGS. 3, 6 and 7, the sprinkler 600 is connected to a supply tube (not shown) that supplies a cooling fluid such as a cooling water, and the sprinkler 600 operates when the temperature inside the battery module 1 or a flow rate of gas inside the battery module 1 increases over a certain level, thereby supplying the cooling fluid into the battery module 1. In other words, if an abnormal situation occurs in the battery cell 100 to cause venting so that a high-temperature gas is discharged, the sprinkler 600 detects the high-temperature gas and operates. If the sprinkler 600 operates in this way, the cooling fluid may be supplied into the battery module 1 to prevent the battery cell 100 from being ignited and/or exploded due to overheating.

A part of the sprinkler 600 is exposed out of the rear cover 340, and the other part of the sprinkler 600 is provided through the rear cover 340 and positioned in an empty space formed between the bus bar frame 200 and the side cover 320. The sprinkler 600 is installed at a side opposite to the air outlet 500 that is formed on one side of the rear cover 340 in a longitudinal direction (a direction parallel to the Y axis).

The sprinkler 600 includes a coupler 610, a sprinkler head 620 and an insulation cover 630. The coupler 610 is positioned at an outer side of the module housing 300 and is connected to the supply tube (not shown) that supplies the cooling fluid. That is, the coupler 610 is made of a metal material and is a component for fastening an external supply tube. The sprinkler head 620 is positioned at an inner side of the module housing 300 and connected to the coupler 610. The insulation cover 630 covers the sprinkler head 620, thereby preventing the sprinkler head 620 from coming into direct contact with the electrode lead 110 of the battery cell 100 and/or the bus bar of the bus bar frame 200 to cause a short circuit.

The sprinkler head 620 includes a glass bulb 621 and a holding bracket 622.

The glass bulb 621 blocks a cooling fluid injection hole P of the coupler 610, and if the temperature inside the battery module 1 or the flow rate of the internal gas heated by the venting gas increases over a reference value, the glass bulb 621 is ruptured to open the cooling fluid injection hole P. The glass bulb 621 contains a liquid that expands as the temperature rises, and the liquid expands if venting occurs in at least some of the battery cells 100 inside the battery module 1 so that the high-temperature venting gas fills in the battery module 1. As the liquid expands, the internal pressure of the glass bulb 621 increases, and at the same time, if the external force of the gas acts together due to the high-pressure venting gas at the outside of the glass bulb 621, the glass bulb 621 is ruptured, so the cooling fluid fills the inside of the module housing 300 through the cooling fluid injection hole P. The holding bracket 622 is made of a metal material and surrounds the glass bulb 621 to fix the glass bulb 621 not to move.

The insulation cover 630 includes a fixing portion 631 and a cover portion 632. The fixing portion 631 is attached to the rear cover 340 by clip fixing. That is, a part of the fixing portion 631 is located at an outer side of the rear cover 340, and the other part of the fixing portion 631 is located at an inner side of the rear cover 340. The cover portion 632 extends in a substantially vertical direction from the fixing portion 631 and covers the sprinkler head 620.

The cover portion 632 includes a first region 632a facing the cell stack and the bus bar frame 200, and a second region 632b other than the first region. The first region 632a is formed so that a closed area is greater than an opened area, and the second region 632b is formed so that an opened area is greater than a closed area. The cover portion 632 is at least partially opened in order to allow the cooling fluid injected through the cooling fluid injection hole P to be smoothly supplied into the module housing 300.

In addition, the opened area of the first region 632a is smaller than the opened area of the second region 632b in order to minimize the possibility of a short circuit caused by the contact between the holding bracket 622 and the electrode lead 110 and/or the contact between the holding bracket 622 and the bus bar. Meanwhile, the first region 632a may have at least one cover hole H for injecting the cooling fluid.

Meanwhile, the cover portion 632 is coupled to the fixing portion 631 fixed to the module housing 300 in a detachable structure. A bonding layer A is interposed between the fixing portion 631 and the cover portion 632, so that the fixing portion 631 and the cover portion 632 are kept coupled to each other when the battery module 1 is in a normal use state. However, if venting occurs at the battery cell 100 to leak a high-temperature gas so that the temperature inside the module housing 300 rises over a reference temperature, the bonding layer A melts and the bonding force of the bonding layer A is decreased or lost. Accordingly, the cover portion 632 is separated from the fixing portion 631 by injecting the cooling fluid or in advance before the cooling fluid is injected.

Other fixing elements other than the bonding layer A may not be applied to the coupling between the fixing portion 631 and the cover portion 632, or a hinging structure may be additionally applied thereto in addition to the bonding layer A as shown in the figures. If a hinging structure is applied to couple the fixing portion 631 and the cover portion 632 to each other, the cover portion 632 is opened while rotating based on the hinged portion h as the bonding force of the bonding layer A is decreased or lost.

As the cover portion 632 is separated from the fixing portion 631 in this way, the cover portion 632 no longer acts as an element that disturbs the injection of the cooling fluid from the cooling fluid injection hole P, thereby enabling smooth fire extinguishing and cooling.

Referring to FIGS. 8 to 11 along with FIG. 3, the outlet closing device 700 is a device for closing the air outlet 500 by moving by a buoyancy when a cooling water is introduced into the module housing 300 through the sprinkler 600. The outlet closing device 700 includes a fixing bar 710 formed on an inner surface of the module housing 300, a sealing door 720 hinged to the fixing bar 710, and a buoyancy member 730 attached to the sealing door 720.

The fixing bar 710 is formed on the rear cover 340 at which the air outlet 500 is formed, and may have a pillar shape whose lateral cross section (the cross section cut in a direction parallel to the X-Y plane) has a fan shape. The fixing bar 710 functions as a support to guide the movement of the sealing door 720. To realize this function, the fixing bar 710 has at least two guide grooves 711. The at least two guide grooves 711 are formed on an outer peripheral surface of the fixing bar 710 at positions spaced apart from each other along the longitudinal direction of the fixing bar 710 (a direction parallel to the Z axis).

The guide groove 711 has an inclined shape based on a horizontal plane (a plane parallel to the X-Y plane) along a direction from one longitudinal end of the guide groove to the other longitudinal end thereof. More specifically, the guide groove 711 has a shape inclined upward toward the air outlet 500. Since the guide groove 711 has an inclined shape, the sealing door 720 may rotate in a direction to close the air outlet 500 when it receives a force upward (parallel to the Z axis) by the buoyancy generated by the cooling water.

The sealing door 720 is hinged to the fixing bar 710 and rotates to close the air outlet 500 when a buoyancy is applied due to the cooling water. To realize this function, the sealing door 720 includes insert protrusions 721 in a number corresponding to the plurality of holes of the air outlet 500 and includes sliding balls 722 in a number corresponding to the number of guide grooves 711.

The insert protrusion 721 is formed to protrude on one surface of the sealing door 720 and has a shape and size corresponding to the hole of the air outlet 500. The insert protrusion 721 is inserted into the hole of the outlet 500 when the sealing door 720 rotates to close the air outlet 500 by receiving a buoyancy due to the cooling water, thereby preventing the cooling water supplied into the battery module 1 from being lost to the outside through the air outlet 500.

The sliding ball 722 has a shape extending from one side of the sealing door 720 toward the fixing bar 710 and is inserted into the guide groove 711. The sliding ball 722 may move along the longitudinal direction of the guide groove 711 inside the guide groove 711. More specifically, if a cooling water is supplied into the module housing 300 and thus the water level of the cooling water rises above a certain level so that the sealing door 720 receives a buoyancy, the sliding ball 722 is guided to move inside the guide groove 711 along the extension direction of the guide groove 711 so that the sealing door 720 may rotate toward the air outlet 500.

The buoyancy member 730 is attached onto one surface of the sealing door 720 so that when the level of the cooling water inside the module housing 300 rises, the sealing door 720 receives a force upward (in a direction parallel to the Z axis) by the buoyancy. The buoyancy member 730 is attached at a side opposite to the side where the insert protrusion 721 is formed, among both sides of the sealing door 720. The buoyancy member 730 may employ any member without limitation as long as it has a lower density than the cooling water and thus may receive buoyancy due to the cooling water. As the buoyancy member 730, for example, an airbag filled with air may be used.

As described above, since the battery module 1 according to an embodiment of the present disclosure includes the outlet closing device 700 capable of closing the air outlet 500 inside the module housing 300, it is possible to prevent the cooling water supplied into the module housing 300 from being leaked to the outside. Accordingly, the battery module 1 according to an embodiment of the present disclosure may quickly respond to an abnormal temperature rise and/or occurrence of a fire inside the battery module 1, thereby securing safety in use of the battery module.

Referring to FIGS. 3 to 6, the battery module 1 may further include a plurality of thermally expanding blocks B. The thermally expanding blocks B are disposed in an empty space inside the module housing 300 so that the level of the cooling fluid increases rapidly when the cooling fluid is supplied into the module housing 300. The thermally expanding block B expands when the temperature inside the module housing 300 rises over the reference temperature as venting occurs at the battery cell 100 to generate a high-temperature venting gas, thereby reducing the volume of the empty space inside the module housing 300.

If the volume of the empty space inside the module housing 300 decreases due to the expansion of the thermally expanding block B, the level of the cooling fluid increases faster when the same amount of cooling fluid is injected, thereby allowing rapid fire extinguishing and cooling.

The thermally expanding block B may include, for example, a thermally expanding foaming agent whose volume increases according to a temperature rise. The thermally expanding foaming agent may have, for example, a core-shell structure including an acrylic thermoplastic resin containing hydrocarbon therein.

Figure 4:
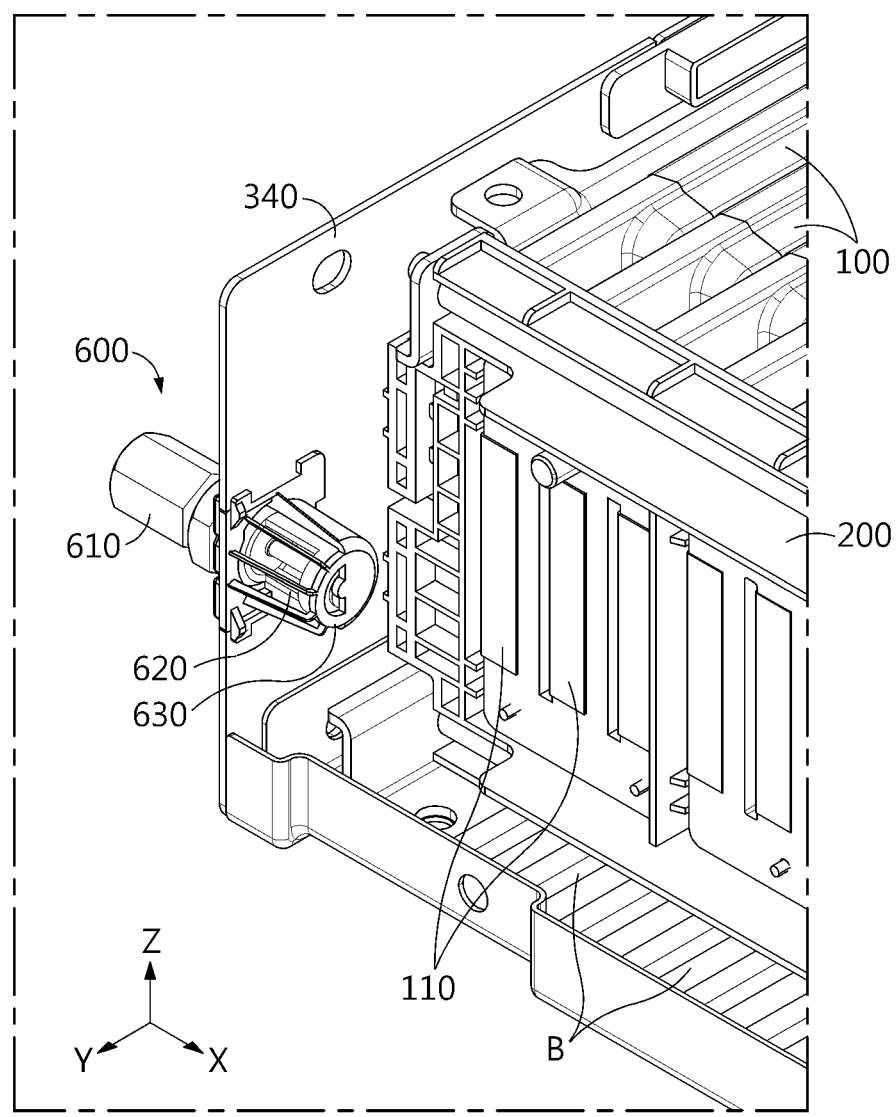
FIGS. 4 and 5 are diagrams showing an inner structure of the battery module according to an embodiment of the present disclosure so that a thermally expanding block applied in the present disclosure is exhibited.

Referring to FIGS. 3 and 4, the plurality of thermally expanding blocks B are fixed to be spaced apart from each other along a longitudinal direction of the battery module 1 (a direction parallel to the X axis) on the base cover 310 that covers the lower surface of the cell stack, and the plurality of thermally expanding blocks B may be disposed in an empty space between the bus bar frame 200 and the side cover 320.

Figure 5:
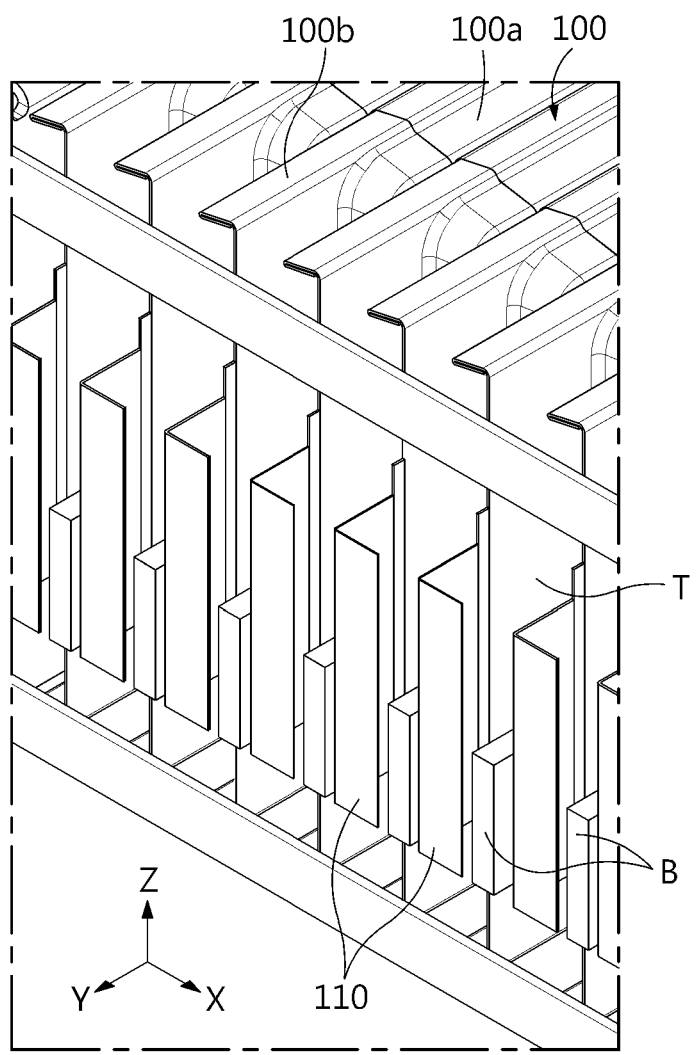

In addition, referring to FIG. 5, the plurality of thermally expanding block B may be disposed between terrace portions T of battery cells 100 adjacent to each other among the plurality of battery cells 100 included in the cell stack. Here, the terrace portion T refers to a partial region of the sealing portion 100b of the battery cell 100. That is, the pouch-type battery cell 100 includes an accommodation portion 100a in which an electrode assembly (not shown) is accommodated, and a sealing region 100b extending from the circumference of the accommodation portion 100a. Here, a portion of the sealing region 100b located in a direction where the electrode lead 110 is drawn is called the terrace portion T.

As described above, if the thermally expanding block B is respectively interposed between the terrace portions T adjacent to each other, it is possible to utilize the dead space, thereby improving the fire extinguishing and cooling efficiency without lowering the energy density.

Meanwhile, in order to maximize the effect of increasing the level of the cooling fluid, the thermally expanding block B may be applied not only to the empty space between the bus bar frame 200 and the side cover 320 and but also between the adjacent terrace portions T.

Figure 13:
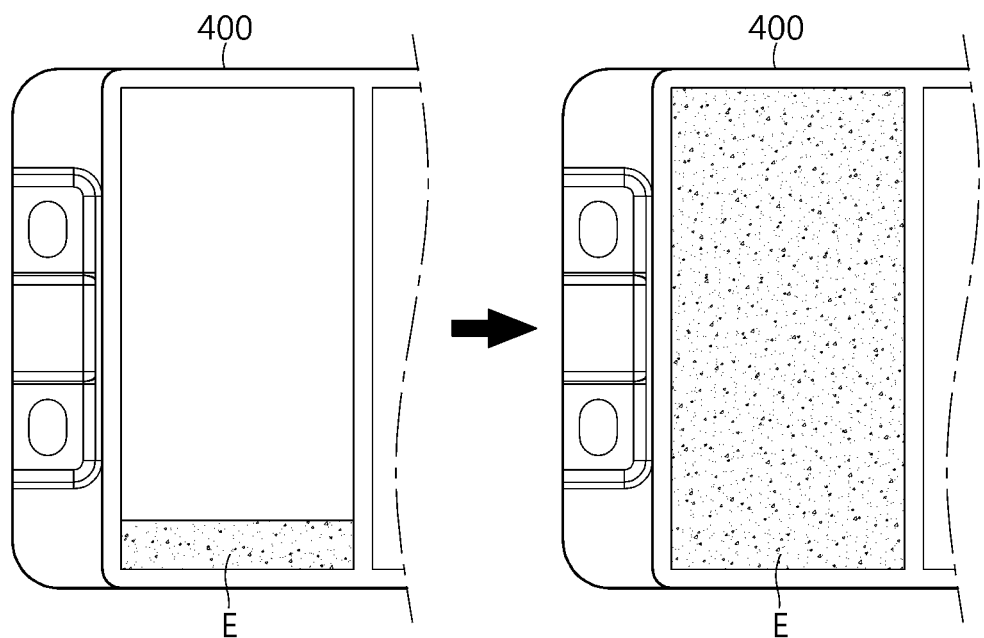
FIG. 13 is a diagram showing a part of a front surface of the battery module according to an embodiment of the present disclosure so that an expansion pad disposed inside the battery module is exhibited.

Referring to FIG. 13, the battery module 1 may further include an expansion pad E configured to at least partially close the air inlet 400 so that the level of the cooling fluid rapidly increases by minimizing the amount of the coolant fluid leaked to the outside when the cooling fluid is supplied into the battery module 1.

The expansion pad E is attached to an inner surface of the module housing 300 and has a size smaller than the opened area of the air inlet 400. When the battery module 1 is in normal use, the expansion pad E preferably has a size less than about 30% of the opened area of the air inlet 400 so that air may smoothly flows through the air inlet 400. Meanwhile, even though the figures of the present disclosure just depict that the expansion pad E is attached at a bottom portion of the inner surface of the module housing 300, the expansion pad E may also be attached to a top portion or a side portion of the module housing 300.

The expansion pad E is expanded by contacting the cooling fluid introduced into the battery module 1 to close the air inlet 400. The expansion pad E contains a resin that exhibits a very large expansion rate when absorbing moisture, for example a resin that increases in volume by at least about two times or more compared to the initial volume when a sufficient amount of moisture is provided thereto. As a resin used for the expansion pad E, a non-woven fabric in which SAF (super absorbent fiber) and polyester staple fiber are mixed may be mentioned, for example. The SAF is prepared by forming a fiber using SAP (super absorbent polymer).

Meanwhile, when the air inlet 400 are closed due to the expansion of the expansion pad E, this does not necessarily mean that the air inlet 400 is closed so completely that the cooling fluid cannot leak, also includes the case where the opened area of the air inlet 400 is decreased to reduce the amount of leakage.

By applying the expansion pad E, when a thermal runaway phenomenon occurs in at least some battery modules 1 and thus a cooling fluid is introduced into the battery modules 1, the air inlet 400 is closed. If the air inlet 400 and the air outlet 500 are closed as above, the cooling fluid introduced into the battery module 1 does not escape to the outside but stays inside the battery modules 1, thereby quickly resolving the thermal runaway phenomenon occurring in the battery modules 1.

Figure 14:
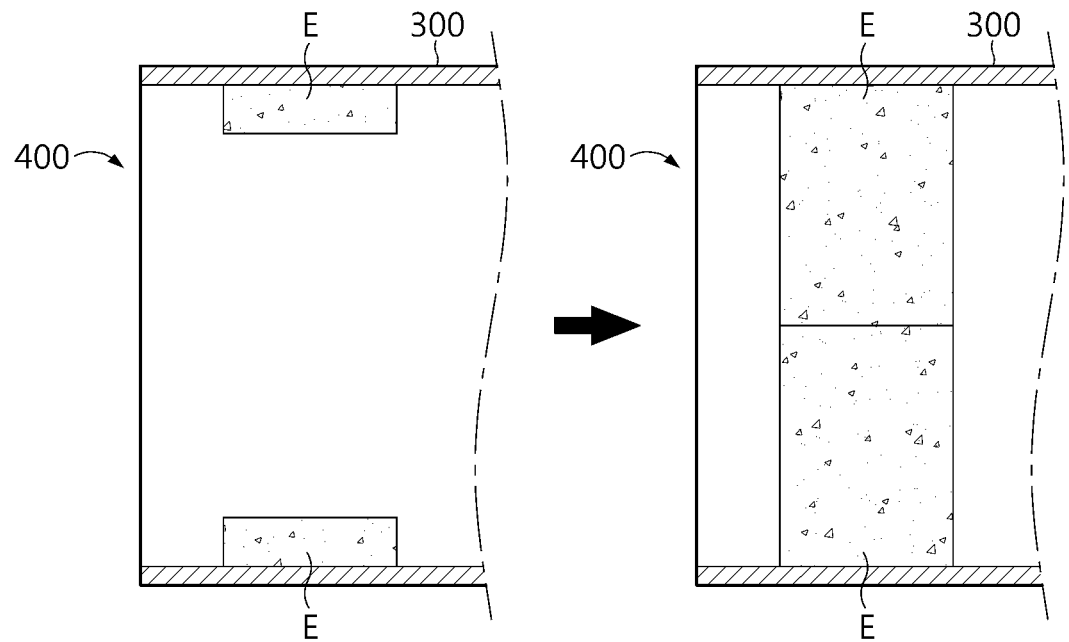
FIGS. 14 to 16 are diagrams showing a part of a section of the battery module according to an embodiment of the present disclosure, observed from a side, so that the expansion pad disposed inside the battery module is exhibited.

Referring to FIG. 14, the expansion pad E may be provided in a pair. In this case, the pair of expansion pads E are attached to an upper portion and a lower portion of the inner surface of the module housing 300, respectively. The pair of expansion pads E are attached at corresponding positions and come into contact with each other to close the air inlet 400 when being expanded.

Figure 15:
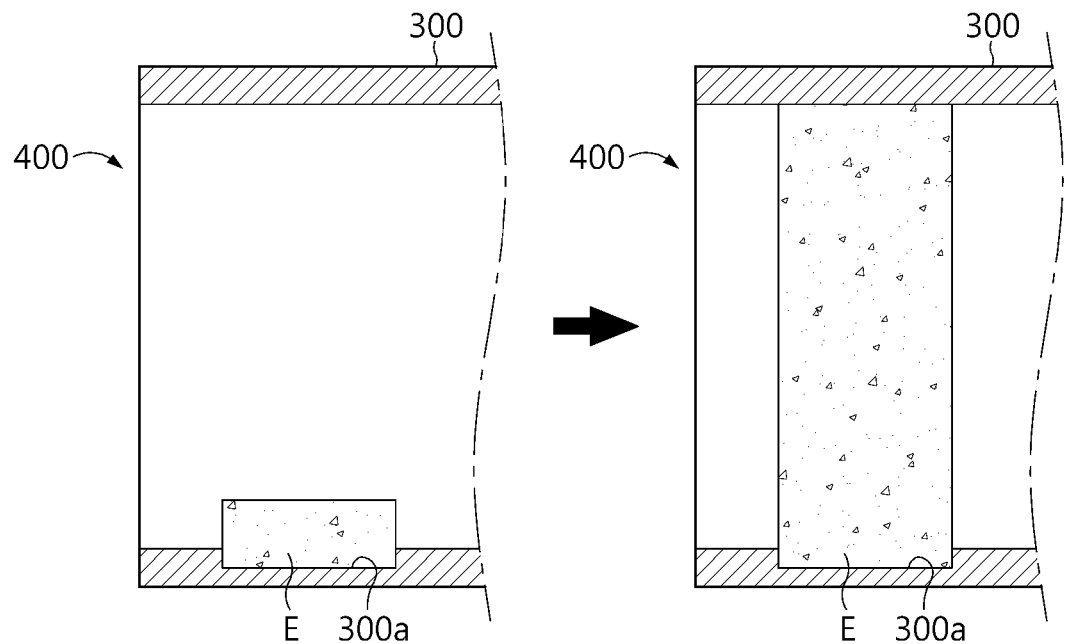

Referring to FIG. 15, the expansion pad E may be fixed by inserting at least a portion of the expansion pad E into an accommodation groove 300a formed to a predetermined depth at the inner surface of the module housing 300.

Figure 16:
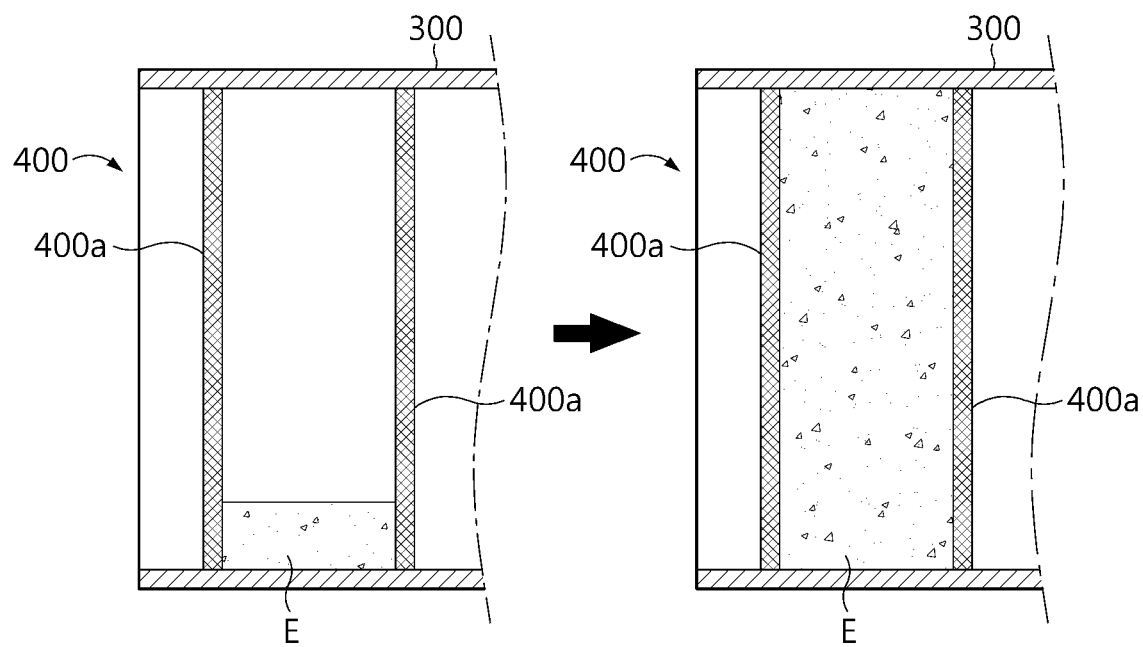

Referring to FIG. 16, the expanding movement of the expansion pad E may be guided by a pair of mesh plates 400a respectively disposed at both sides thereof when being expanded by absorbing moisture. The mesh plates 400a are mesh-type plates and have a structure that allows air and the cooling fluid to pass therethrough in a state where the expansion pad E is not expanded.

Meanwhile, an ESS (Energy Storage System) according to an embodiment of the present disclosure includes a plurality of battery modules according to an embodiment of the present disclosure as described above.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery module, comprising:
   a sub module including a cell stack having a plurality of battery cells and a pair of bus bar frames respectively coupled to a first side and a second side of the cell stack;
   a module housing configured to accommodate the sub module and configured to have an air inlet and an air outlet formed to circulate air;
   a sprinkler provided through the module housing at one side of the cell stack in a stacking direction; and
   a hinged outlet closure configured to rotate by a buoyancy generated by a cooling water introduced into the module housing through the sprinkler so that the air outlet is closed.

2. The battery module according to claim 1, wherein the outlet closure includes:
   a fixing bar fixed on an inner surface of the module housing;
   a sealing door hinged to the fixing bar; and
   a buoyancy member attached to the sealing door.

3. The battery module according to claim 2 wherein the fixing bar has at least two guide grooves,
   wherein the sealing door includes sliding balls in a number corresponding to a number of the guide grooves, and
   wherein each sliding ball is inserted into a respective one of the at least two guide grooves and guided to move along an extension direction of the at least two guide grooves.

4. The battery module according to claim 3, wherein each of the at least two guide groove is shaped to be inclined upward toward the air outlet.

5. The battery module according to claim 2, wherein the air outlet has a plurality of holes formed through the module housing, and
   wherein the sealing door has a plurality of insert protrusions having a shape and size corresponding to the plurality of holes.

6. The battery module according to claim 1, wherein the battery module comprises an expansion pad disposed at an inner side of the air inlet and configured to at least partially close the air inlet by expanding when contacting a cooling fluid introduced into the battery module.

7. The battery module according to claim 6, wherein the expansion pad is attached onto an inner surface of the module housing.

8. The battery module according to claim 6, wherein the expansion pad is at least partially inserted into an accommodation groove formed at an inner surface of the module housing.

9. The battery module according to claim 6, wherein the battery module comprises mesh plates respectively disposed at opposite sides of the expansion pad to guide an expanding movement of the expansion pad.

10. The battery module according to claim 1, wherein the battery module comprises a thermal expansion block disposed at an empty space inside the module housing to thermally expand as an internal temperature of the module housing rises.

11. The battery module according to claim 1, wherein the sprinkler includes:
- a coupler positioned at an outer side of the module housing and configured to be connected to a supply tube that supplies a cooling fluid;
- a sprinkler head positioned at an inner side of the module housing and connected to the coupler; and
- an insulation cover including a fixing portion fixed to the module housing and a cover portion fixed to the fixing portion by a bonding layer and configured to be separated from the fixing portion when an internal temperature of the module exceeds a reference temperature as a bonding force of the bonding layer is decreased or lost.

12. The battery module according to claim 11, wherein the cover portion is hinged to the fixing portion and is opened by rotating to a lower side of the sprinkler head.

13. An energy storage system (ESS), comprising a plurality of battery modules according to claim 1.

* * * * *